C. E. HOUSE.
DIRIGIBLE AUTOMOBILE HEADLIGHT.
APPLICATION FILED JAN. 31, 1917.

1,226,665.

Patented May 22, 1917.

Inventor
CHARLES E. HOUSE
By H. S. Hill
Attorney

UNITED STATES PATENT OFFICE.

CHARLES E. HOUSE, OF EUSTIS, NEBRASKA.

DIRIGIBLE AUTOMOBILE-HEADLIGHT.

1,226,665.　　　　　Specification of Letters Patent.　　Patented May 22, 1917.

Application filed January 31, 1917. Serial No. 145,676.

*To all whom it may concern:*

Be it known that I, CHARLES E. HOUSE, a citizen of the United States, residing at Eustis, in the county of Frontier, State of Nebraska, have invented new and useful Dirigible Automobile-Headlights; and I do hereby declare the following to be a full, clear, and exact description of the invention, such as will enable others skilled in the art to which it appertains to make and use the same.

The present invention relates to a dirigible headlight construction for automobiles, and has for its object to provide a device of this character which embodies novel features of construction whereby the headlights are automatically turned with the front wheels, thereby causing the light to be projected in the direction in which the vehicle is turning and enabling sharp turns to be made at night without danger.

Further objects of the invention are to provide a dirigible headlight construction which can be readily applied as an attachment to any conventional type of automobile, which is operated directly from the steering mechanism of the automobile and does not necessitate the making of any changes therein, which is dependable in its operation, and which can be produced at a comparatively low cost of manufacture.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Corresponding and like parts are referred to in the following description and indicated in all the views of the drawings by the same reference characters.

Figure 1:
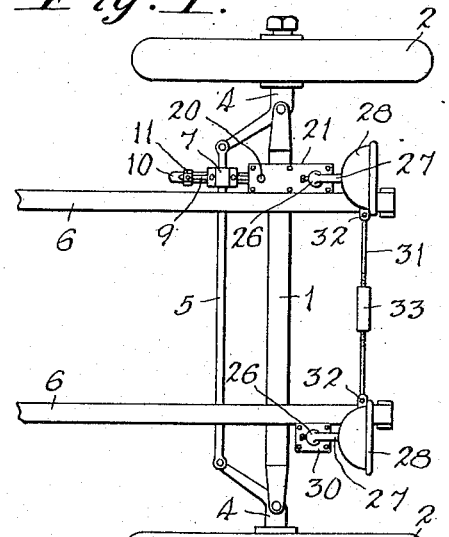
Figure 1 is a top plan view of the forward end of an automobile chassis having the dirigible headlight attachment applied thereto.
Figure 2:
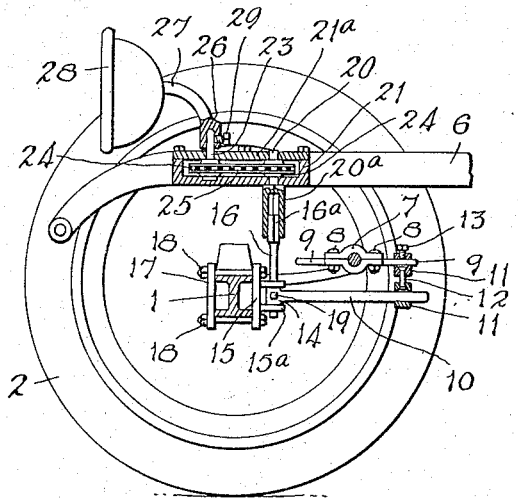
Fig. 2 is a side elevation of the device, portions being broken away and shown in section.
Figure 3:
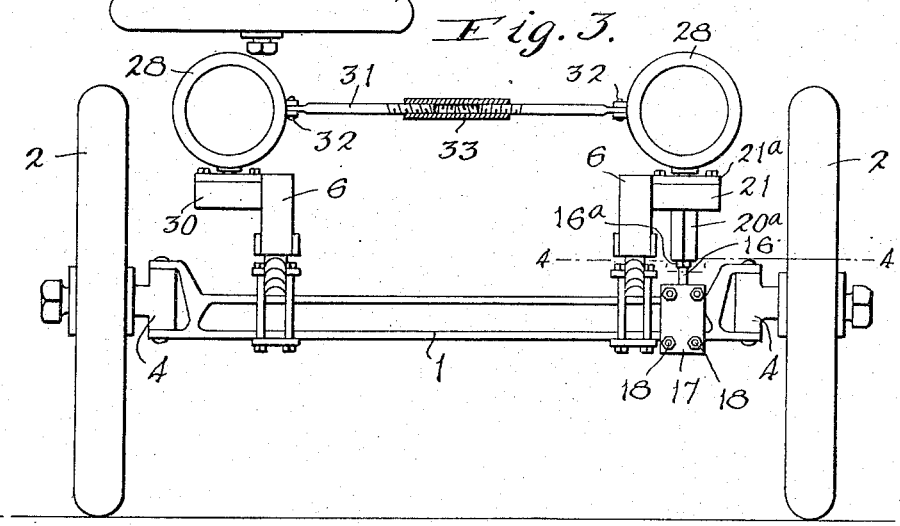
Fig. 3 is a front elevation of the device, portions appearing in section.
Figure 4:
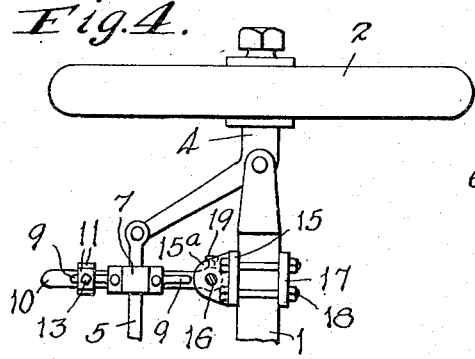
Fig. 4 is a horizontal sectional view on the line 4—4 of Fig. 3.
Figure 5:
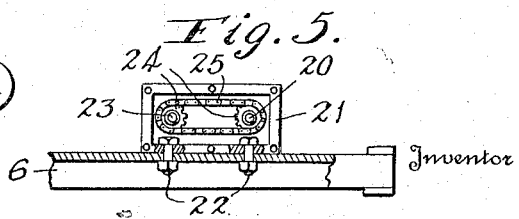
Fig. 5 is a top plan view of the gear casing and a portion of one of the side bars of the vehicle frame, the top of the casing being removed and portions being broken away and shown in section.

For the purpose of illustration the dirigible headlight construction is shown as applied to the forward end of an automobile chassis of the conventional construction, said chassis being illustrated in a diagrammatic manner and including a front axle 1, front wheels 2, steering knuckles 4, a transverse actuating rod 5 which extends between the steering knuckles, and the main frame side bars 6.

A clamp 7 is rigidly applied to the transverse connecting rod 5 at a suitable point in the length thereof, said clamp including complemental memberes which are fitted upon the connecting bar from opposite sides thereof and held together by bolts 8, one of the elements of the clamp being provided with forwardly and rearwardly projecting extensions 9. Either one of these extensions 9, depending upon the particular make of automobile to which the attachment is being applied, is operatively connected by a swivel joint to the rear end of a lamp operating lever 10. This swivel connection is shown as including a pair of collars 11 which are fitted upon the respective elements and have a swivel connection with opposite ends of a vertical pivot pin 12. A set screw 13 may be provided for locking the upper collar rigidly in position.

The forward end of the lamp operating lever 10 terminates in a sleeve 14 which is fitted between the pivot ears 15ª of a bearing bracket 15 and receives the lower end of a vertical shaft 16 which is journaled within the said pivot ears 15ª. This bearing bracket 15 is rigidly clamped in position upon the front axle 1 in some suitable manner as by means of the clamping plate 17 and bolts 18. The sleeve 14 of the lever 10 is rigidly applied to the shaft 16, in some suitable manner as by means of a set screw 19 and can be applied to the shaft at any point in the length thereof, depending upon the distance between the front axle and the side bar extensions 6 of the main frame. The upper end of the vertical shaft 16 has a polygonal formation, as indicated at 16ª, and telescopes within a correspondingly shaped tubular extension 20ª which projects downwardly from a shaft 20 which is journaled within a casing 21. This casing 21 is shown as provided with a removable cover 21ª, and as secured by suitable fastening members such as the bolts 22 to the side bar extensions 6. A second shaft 23 is also journaled within the casing 21, the said shafts 20 and 23 being provided with sprocket wheels 24 which are engaged by a sprocket chain 25 so that both of the shafts must always rotate in unison. The shaft 23 is formed with an extension which projects upwardly above the casing 21 and which has the socket 26 of the bracket arm 27 of a headlight 28 clamped thereon by means of a set screw 29. The headlight 28 on the opposite side of the vhicle is mounted in a similar manner upon a short vertical shaft which is journaled within a casing 30 applied to the other side bar extensions 6, although there is no direct connection between this second headlight 28 and the steering gear, the two headlights being connected by a cross rod 31 so as to move in unison. This cross rod has the ends thereof pivotally connected to the respective headlights 28, as indicated at 32, and is preferably formed in sections which have a turnbuckle connection 33 so that the length of the rod can be adjusted to fit the device to different machines, and also to adjust the lamps either to project the light straight ahead or to focus it on the center of the road.

With the above construction it will be obvious that the headlights will be automatically turned in the same direction as the front wheels 2 when steering the vehicle, since the longitudinal movement of the connecting rod 5 of the steering gear which is necessarily incident to turning the front wheels in either direction will result in swinging the lamp operating lever 10 as well as the steering knuckles 4. This swinging movement of the lever 10 will rotate the vertical shaft 16, and motion will be imparted from this shaft through the shafts 20 and 23 and the chain and sprocket connection between them to the headlights 28. The telescoping connection between the polygonal upper end of the vertical shaft 16 and the tubular extension of the short shaft 20 will compensate for the up and down movement of the vehicle body relative to the front axle which is due to the fact that the vehicle body is mounted upon springs. The vertical vibrations of the vehicle body are thus provided for without interfering in any manner with the operative connection between the headlights and the vertical shaft 16 on the front axle.

Having thus described the invention, what I claim as new and desire to secure by Letters Patent, is:—

1. A dirigible headlight for motor vehicles, including a casing adapted to be mounted on the vehicle frame, a pair of vertical shafts journaled within the casing, a chain and sprocket connection between the vertical shafts, a headlight carried by one of the shafts, a bearing bracket adapted to be applied to the front axle, a vertical operating shaft journaled upon the bearing bracket and having a sliding and interlocking engagement with the other shaft of the casing, and an operative connection between the vertical operating shaft and the connecting rod of the vehicle steering gear.

2. A dirigible headlight for motor vehicles, including a casing adapted to be mounted on the vehicle frame, a pair of short vertical shafts journaled within the casing, a chain and sprocket connection between the short shafts, a headlight carried by one of the shafts, a tubular extension projecting downwardly from the other shaft, a bearing bracket adapted to be applied to the front axle, a vertical operating shaft journaled within the bearing bracket and formed with a polygonal upper end which has a sliding and telescoping engagement with the tubular extension of the short shaft of the casing, a lamp operating arm applied to the vertical operating shaft, and an operative connection between the said arm and the connecting rod of the steering gear.

3. A dirigible headlight for motor vehicles, including a casing adapted to be mounted on a vehicle frame, a pair of short vertical shafts journaled within the casing, a chain and sprocket connection between the short shafts, a lamp carried by one of the short shafts, a tubular extension projecting downwardly from the other short shaft, a bearing bracket adapted to be applied to the front axle and formed with spaced pivot ears, a vertical operating shaft journaled within the pivot ears of the bearing bracket and formed with a polygonal upper end which has a sliding and interlocking engagement with the tubular extension of the shaft of the casing, a rearwardly extending operating arm provided with a sleeve which is received within the pivot ears of the bracket and is clamped in an adjusted position upon the vertical operating shaft, and an operative connection between the said operating arm and the transverse connecting rod of the steering gear.

4. A dirigible headlight for motor vehicles, including a clamp adapted to be applied to the connecting rod of the steering gear and formed with rearwardly and forwardly projecting extensions, a bearing bracket adapted to be applied to the front axle, a vertical shaft journaled within the bearing bracket, a horizontal operating arm rigid with the vertical shaft, set collars applied to the operating arm and one of the extensions of the clamp, a pivot pin having swivel connections with the two set collars, and a headlight operatively connected with the vertical shaft.

In testimony whereof I have signed my name to this specification in the presence of two subscribing witnesses.

CHARLES E. HOUSE.

Witnesses:
Wm. Schilpep,
E. C. Menney.

Copies of this patent may be obtained for five cents each, by addressing the "Commissioner of Patents, Washington, D. C."